United States Patent
Wolff et al.

(10) Patent No.: US 7,169,470 B2
(45) Date of Patent: Jan. 30, 2007

(54) ALUMINOSILICATE GLASS

(75) Inventors: Silke Wolff, Hueckeswagen (DE); Ute Woelfel, Mainz (DE); Uwe Kolberg, Mainz (DE); Holger Kasprzik, Mainz (DE)

(73) Assignee: Schott AG, Mainz (DE)

( * ) Notice: Subject to any disclaimer, the term of this patent is extended or adjusted under 35 U.S.C. 154(b) by 105 days.

(21) Appl. No.: 10/785,811

(22) Filed: Feb. 24, 2004

(65) Prior Publication Data

US 2004/0220038 A1 Nov. 4, 2004

(30) Foreign Application Priority Data

Feb. 25, 2003 (DE) .................. 103 09 495

(51) Int. Cl.
 *D02G 3/00* (2006.01)
 *B32B 17/06* (2006.01)
 *C03C 13/04* (2006.01)
 *C03C 3/085* (2006.01)

(52) U.S. Cl. ............... 428/375; 428/373; 428/426; 501/37; 501/69

(58) Field of Classification Search ........... 501/35, 501/55, 64, 68, 72, 73, 153, 37, 69; 428/373, 428/375, 426
See application file for complete search history.

(56) References Cited

U.S. PATENT DOCUMENTS

| | | |
|---|---|---|
| 3,940,278 A | 2/1976 | Wolf |
| 3,999,836 A | 12/1976 | Wolf |
| 4,264,131 A | 4/1981 | Sawamura et al. |
| 4,265,667 A * | 5/1981 | Ikeda et al. ............ 501/37 |
| 4,472,030 A | 9/1984 | Tachibana et al. |
| 6,268,303 B1 * | 7/2001 | Aitken et al. ............ 501/63 |

FOREIGN PATENT DOCUMENTS

| | | |
|---|---|---|
| DE | 19 24 493 C3 | 2/1970 |
| DE | 26 15 534 | 10/1977 |
| DE | 27 47 919 | 5/1978 |
| DE | 29 40 451 A1 | 4/1980 |
| DE | 30 16 116 C2 | 10/1981 |
| DE | 32 17 897 C3 | 12/1982 |
| DE | 196 31 580 C1 | 11/1997 |
| EP | 0 018 110 B1 | 10/1980 |
| EP | 0 081 928 B1 | 6/1983 |
| GB | 2 223 781 A | 1/1991 |
| JP | 52-45612 | 4/1977 |
| JP | 60-46945 | 3/1985 |
| JP | 60-221338 | 11/1985 |
| JP | 62-12633 | 1/1987 |
| JP | 62-12635 | 1/1987 |
| JP | 62-55761 | 3/1987 |
| JP | 1-133956 | 5/1989 |
| JP | 3-37130 | 2/1991 |
| JP | 6-107425 | 4/1994 |
| JP | 10-130033 | 5/1998 |

* cited by examiner

*Primary Examiner*—Jennifer C. McNeil
*Assistant Examiner*—G. Blackwell
(74) *Attorney, Agent, or Firm*—Harness, Dickey & Pierce, P.L.C.

(57) ABSTRACT

A short optical glass is disclosed which does not comprise any silver, copper, thallium, lead or boron and is particularly suited for the application imaging, projection, telecommunication, optical information technology, and/or laser technology, also particularly suited for fiber applications (light guides or imaging guides). Preferably the glass has a refractive index of $1.55 \leq n_d \leq 1.65$ and an Abbe coefficient of $48 \leq v_d \leq 57$ and also has good attenuating and ion exchange characteristics, good chemical stability and good crystallization stability. The glass comprises 35 to <50 wt.-% $SiO_2$; 1 to 10 wt.-% $Al_2O_3$; 5 to 15 wt.-% $Na_2O+K_2O+CS_2O+Li_2O$; 20 to 30 wt.-% $BaO$; 0 to 15 wt.-% $ZnO$; 0 to 10 wt.-% $La_2O_3$; 0 to 10 wt.-% $ZrO_2$; 0 to 6 wt.-% $P_2O_5$; 0 to 8 wt.-% $MgO+CaO+SrO$; 0 to 3 wt.-% of other oxides, and $Cs_2O<1$, $Li_2O<1$, and $TiO_2<1$ wt.-%.

16 Claims, No Drawings

ALUMINOSILICATE GLASS

BACKGROUND OF THE INVENTION

The invention relates to an aluminosilicate glass for optical applications which in particular can be used advantageously as a core glass in optical fibers.

Prior art optical glasses having a refractive index between 1.55 and 1.65 (light barium flint region and extra dense crown region) usually contain PbO to reach the desired optical characteristics (refractive index of $1.55 \leq n_d \leq 1.65$ and an Abbe number of $48 \leq v_d \leq 57$) and a good transmission. Such glasses are of interest for numerous optical applications, e.g. for applications in imaging, projection, telecommunication, optical communication engineering and laser technology, however, in particular also for fiber applications (imaging fibers and/or light transmission fibers). Due to their lead content such glasses offer a low chemical resistance. Also often $As_2O_3$ is used as a refining agent. Since within the last years the glass component PbO and often also $As_2O_3$ has been regarded as environmentally problematic, the most manufacturers of optical instruments and products tend to use glasses free of lead and arsenic. For the application in products having a high degree of coating also materials of enhanced chemical stability (for undergoing the coating processes without damage) by keeping a high transmission (very low loss) are gaining more and more importance.

For replacing lead in classical optical glasses, glasses containing large amounts of $TiO_2$ in a silicate matrix are known that lead to glasses being very instable with respect to crystallization, being difficultly meltable and hardly processable. In addition, the transmission of the glasses deteriorates (the loss increases) due to the intrinsic adsorption of $TiO_2$.

Also lately the development of "short" glasses has been desired due to processing aspects, i.e. glasses the viscosity of which is extremely temperature dependent. This behavior during processing offers the advantage that hot forming times, i.e. the times of mold closure, can be reduced. Thereby throughput can be enhanced on the one hand, and on the other hand it is easy on the mold material, this having a very positive effect on the total manufacturing cost. Also due to the fast cooling (shorter mold closure times) even glasses exhibiting an enhanced crystallization tendency can be processed when compared with longer glasses, and an initial nucleation which would be problematic during subsequent secondary heat-forming steps (fiber drawing, ion-exchange, subsequent pressing, reforming, fine cooling, etc.) is avoided.

For micro structuring purposes (gradient-index lenses, (flat, rod shaped fiber (bundle)-like) light guides, spherical lenses etc.) using ion-exchange (e.g. (Na—Ag)) the novel materials should also be ion-exchangeable on an economical basis in standard processes. An additional characteristic may be the tension building ion-exchangeability (e.g. Na—K, "pretensioning").

Optical materials for general applications should also be applicable in fiber applications, e.g. as fiber core glasses. To this end, novel types of glasses must particularly be tolerant against secondary heat-forming steps (fiber drawing, melting together, etc.) and must have a good compatibility with conventional fiber cladding glasses.

Commonly, a glass fiber for the transmission of light comprises a highly refractive core glass and a cladding glass enclosing the core glass and having a lower refractive index than the core glass. Under suitable conditions, stepped-index fibers comprising a core glass and a cladding glass completely enclosing the core glass at its outer peripheral wall can be produced. A light transmissive glass body of fiber shape within which the core glass offers a constant refractive index across the total cross surface is referred to as a stepped-index fiber. Glass fibers of this type transmit light, being introduced at one end of the fiber into the core, to the other end of the fiber, wherein the light is completely reflected at the interface between the core glass and the cladding glass (total reflection).

The amount of light that can be coupled into and transmitted within such a fiber is proportional to the square of the numerical aperture (NA) of the fiber and to the cross-sectional area of the fiber core. For transmitting large light amounts via long or middle distances ($\leq 100$ meters), such stepped-index fibers are often packed together to dense fiber bundles, are equipped with a protecting hose, are bonded with their ends to metal shells, and the front surfaces are processed to yield optically flat surfaces by grinding and polishing. Suitably fabricated optical fiber bundles are referred to as fiber optical light guides. In case a production process is used which allows for a geometric arrangement of individual fibers, in this way image light guides can be produced.

The higher NA of the individual fibers within the bundle, the larger amounts of lights can be transmitted by these light guides.

Fiber optical light guides are used in various technical and medical applications (general industrial processes, illumination, traffic, automobile, architecture, endoscopy, dental medicine). Their most important function is the transmission of a light stream as large as possible from a place A to another place B, normally via short or middle distances (a few to 100 meters maximum). Herein often light emerging from a high power light source, such as a halogen or discharge lamp, is coupled into the fiber bundle by means of optical aids, such as a lens or a reflector.

The light amount transmitted by fiber optical light guides depends, apart from NA of its fibers, also from the transmissive characteristics of the core glasses contained therein. Only core glasses of very specific compositions having very low contaminations in the raw materials, from which they are molten, transmit the light with low attenuation along the total length of the light transmitter. The raw materials for melting such core glasses are relatively expensive due to the high purity required which may lead to considerable manufacturing costs for such fibers or for such light guides made thereof.

Apart from the amount of light transmitted by a fiber optical light guide, also a color true transmission of the light is of importance in many cases. Due to the spectral transmissive dependence of the core glass which is contained in the fibers, there may be a color deviation in the color position of the feeding light source, which may have a higher or lower degree, this often leading to a yellow color cast of the light emerging from the light guide. This is always detrimental when a color neutral representation is required (e.g. in the medical endoscopy with photographical image documentation for differentiating between healthy and malignant tissue etc.). The manufacture of optical stepped-index fibers from multi-component-glasses is performed either in the so-called double-mold process or in the rod-tube process. In both cases, the core and cladding glasses are heated up to temperatures which correspond to a viscosity range between $10^4$ and $10^3$ dpas, and are drawn to fibers. To allow a manufacture of a stable fiber with low loss, the core and cladding glasses must be compatible to each other with respect to a variety of characteristics, such as the course of viscosity, the thermal expansion, the crystallization tendency, etc. In particular, there may be no contact reaction or crystallization, respectively, at the interface between the fiber core and cladding which would considerably impair a total reflection of the light introduced into the fiber core and which would render the fiber unsuitable for an application for low-loss light transmission. In addition, also the mechanical stability of the fiber would be negatively influenced by crystallization.

From DE 27 47 919 A1 a photochromic glass is known which predominantly comprises silver oxide or alternatively at least copper oxide. Such photochromic glasses change their spectral transmission characteristics toward lower transmissivities under the influence of electromagnetic radiation in the visible spectral range. The addition of silver and possibly of copper leads to a considerably deteriorated transmission characteristic and to an unnecessary cost increase of the glasses for the desired applications.

Another phototropic glass is known from DE 1 924 493 C3. The respective glass comprises a high amount of $B_2O_3$ which is between 30 and 80 mol-%. This high boron content decreases the crystallization stability of the glasses due to an extreme decrease in viscosity, since the migration velocity of crystal forming components is increased. Also the boron content increases the aggressiveness against refractory material so that production costs are largely increased by shorter melting pot lives. Also $La_2O_3$ having a high intrinsic absorption and thereby being detrimental with respect to attenuation, must be added by at least one mol-%.

Optical glasses having a highly anomalous partial dispersion are known from JP 98 130 033 A. Also these glasses have a high content of at least 12.5 wt.-% of $B_2O_3$. In addition they contain by obligation at least 6 wt.-% of the very expensive raw material $Nb_2O_5$ for reaching the claimed optical characteristics.

Also the glasses disclosed by JP 91 037 130 A (patent abstracts of Japan 03 037 130 A) must be considered in a comparable way. Also here, apart from the mandatory boron trioxide content of at least 11 wt.-% there is an addition of at least 4 wt.-% of $La_2O_3$ and/or of $Gd_2O_3$ for reaching particular optical characteristics, this leading to an increase in loss. Also a mandatory amount of at least 3 wt.-% $Li_2O$ is detrimental, this leading to an additional increase in aggressiveness of the glass against the refractory material, even increasing together with the existing $B_2O_3$ in a synergistic way.

Also, the optical glasses known from JP 85 221 338 A (patent abstracts of Japan 60 221 338 A) must be evaluated in a similar way. The mandatory $B_2O_3$ content of at least 1 wt.-% and of 0.5 wt.-% of $Li_2O$ enhances crystallization and decreases the refractory material resistance, while the mandatory amounts of at least 1 wt.-% $La_2O_3$ and at least 0.1 wt.-% of $Y_2O_3$ necessary for achieving the optical position decrease the attenuation characteristics of the material by intrinsic absorption while simultaneously increasing the cost of the glass.

From JP 89 133 956 A (patent abstracts of Japan 01 133 956 A) also a glass for the manufacture of index-gradient lenses is known having a $B_2O_3$ content of up to 20 wt.-%, this also having the same drawbacks.

The glass known from JP 87 012 635 A (patent abstracts of Japan 62 012 635 A) must be considered in a similar way. This glass comprises a mandatory amount of 10 mol-% of $Li_2O$ and an optional amount of boron trioxide of up to 8 mol-%. Also at least 3 mol-% of $Nb_2O_5$ are added for reaching the optical characteristics.

JP 87 055 761 B also discloses glasses intended for ion-exchange and thereby for the manufacture of index-gradient lenses. Herein tantalum is used for ion-exchange which, from a current point of view, leads to an increased danger potential in excavation, extraction, purification and processing several orders higher than incurred with lead.

The same argumentation holds true with respect to the glasses known from DE 3 217 897 A1 which comprise at least 1 wt.-% of thallium.

The glasses known from DE 3 016 116 C2 have mandatory amounts of BaO which are between 30 and 45 wt.-% and also comprise at lease 5 wt.-% of boron trioxide. Herein on the one hand the position of the refractive index is shifted to refractive index values and dispersions higher than desired due to the high barium oxide contents. Also alkaline earth oxides at high amounts tend to produce diffusion barrier layers within the glass system and thus counteract an effective, economical ion-exchange process. Also they lower the crystallization stability of the glasses, in particular with combination with $ZrO_2$ (mandatory compounded content $BaO+ZrO_2 > 38$ wt.-%). Also the aggressiveness against refractory material is increased by the addition of boron trioxide.

Also glasses suitable for index-gradient lenses are disclosed by JP 87 012 633. Herein, an ion-exchange process with cesium-zinc is described. $Cs_2O_3$ with a mandatory content of at least 2.86 wt.-% is an extremely expensive raw material which does not have any function which could not also be overtaken by other alkali metal oxides, apart from adjusting the necessary ion-exchange characteristics according to this publication.

From GB 2 233 781 A further optical glasses for an achromatic lens system are known which consist of $SiO_2$, $R_2O$ and $ZrO_2$, wherein $R_2O$ is selected from $Li_2O$, $Na_2O$ and $K_2O$ and the components comprise at least 30 wt.-% of the glass, wherein the rest shall be selected from compatible components, having a refractive index of 1.70 maximum and an Abbe number of less than 55. However, practically this application only discloses glasses comprising at least 2.6 wt.-% $Li_2O$ or at least 7 wt.-% PbO or $ZrO_2$ additions of at least 10 wt.-%.

While the addition of PbO is detrimental for the chemical stability, the addition of $Li_2O$ impairs the refractory material stability. However, too high amounts of $ZrO_2$ may lead to increased crystallization tendency.

From JP 77 045 612 A an optical flint glass is known, i.e. a glass having a higher refraction index with increased dispersion. Herein, it is mandatory to add 5 to 60 wt.-% $Nb_2O_5$ to achieve the desired optical characteristics. This is an expensive raw material, in particular in optical qualities, which should be avoided, if possible.

For the manufacture of stepped-index fibers in the prior art basically three fiber systems are known.

The fiber system which is probably the best-known and most common one comprises a core glass of high lead content (commonly 35 wt.-% PbO and an alkali borosilicate glass as a cladding glass. The advantage rests in the high numerical aperture that can be reached (up to more than 0.7 with PbO contents of >50% in the core glass) together with low manufacturing costs and a good capability of drawing to fibers without crystallization problems. This, however, is in contrast to drawbacks such as a mediocre or bad attenuation (200 to 300 dB/km) as well as a somewhat high color cast, mainly caused by Pb self absorption (blue edge of the visible spectral range), as well as dragged-in contaminations of elements highly blue coloring, such as chromium and nickel. Also lead as an environmentally polluting material has come into disrepute more and more and hence is applied for fibers only in specific applications or not at all any more.

A second fiber system comprises an alkali borosilicate glass which is applied as a core as well as a cladding glass.

In the prior art several such glass systems are described, e.g. within EP 0 018 110 B1 or in EP 0 081 928 B1 or in DE 29 40 451 A1 or in U.S. Pat. No. 4,264,131. Partially these glasses, apart from a high boron content, also contain high amounts of alkaline earth and/or zirconium and germanium oxide to reach the desired high refractive index. The advantage rests in the very low attenuation (partially around 10 dB/km) and in their low color cast together with normally environmentally friendly raw materials. A disadvantage of these glasses rests in the commonly lower numerical aperture of the fibers as well as in a lower chemical stability. Also the mandatory boron oxide amount (U.S. Pat. No. 4,264,131, EP 0 081 928 B1, DE 29 40 451 A) is detrimental with respect to the refractory material stability. Due to the lower chemical stability the fibers, during their manufacture, directly after drawing, e.g. from a drawing die at the double mold, must be supplied online with a plastic coating protection against possible chemical and/or mechanical attack. In addition, the low attenuation is achieved only by utilizing highly pure and thereby very expensive raw materials. The two last mentioned aspects, high manufacturing cost and a mandatory plastic coating, thus render practically impossible an application as fiber bundles for broader applications. By contrast, they are used as single fibers for data or energy transfer (laser fiber) in a variety of special applications.

Also fibers on pure $Si_2O$-basis basically are possible as a third fiber system for fiber bundles for the transmission of light. Their advantages resting in an extremely low attenuation (up to 6 dB/km) in a good color neutrality and good environmental compatibility, are in contrast in particular to the high cost. Pure silica glass is extremely expensive due to its high processing temperature. In addition, there is a complicated doping process of the so-called preform according to which by the introduction of fluorine into the surface of a cylindrical rod the necessary reduction in refractory index of the pure quartz is reached that is necessary as an optical isolation to achieve light transfer in the later fiber. Also the numerical aperture of quartz fibers that can be reached is somewhat limited (0.22).

SUMMARY OF THE INVENTION

Therefore, it is a first object of the current invention to disclose an optical glass of high quality having a refractive index in the range between 1.55 and 1.65 and an Abbe number between 48 and 57.

It is a second object of the current invention to disclose an optical glass having an increased chemical stability.

It is a third object of the current invention to disclose an optical glass having a low loss or attenuation.

It is a fourth object of the current invention to disclose an optical glass having a good tolerance for secondary heat shaping steps and exhibiting good crystallization stability.

It is a fifth object of the current invention to disclose an optical glass suitable as a fiber core glass, preferably being compatible with common fiber optical cladding glasses.

It is a sixth object of the current invention to disclose an optical glass suitable as a fiber core glass in a stepped-index fiber.

These and other objects of the invention are achieved by a glass comprising (in wt.-%):

| | |
|---|---|
| $SiO_2$ | 35 to <50 |
| $Al_2O_3$ | 1 to 10 |
| $Na_2O + K_2O + Cs_2O + Li_2O$ | 5 to 15 |
| $Cs_2O$ | <1 |
| $Li_2O$ | <1 |
| BaO | 20 to 30 |
| ZnO | 0 to 15 |
| $La_2O_3$ | 1 to 10 |
| $ZrO_2$ | 0 to 10 |
| $TiO_2$ | <1 |
| $P_2O_5$ | 0 to 6 |
| MgO + CaO + SrO | 0 to 8 |
| other oxides | 0 to 3, | wherein the glass, apart from any unintended contamination, does not contain any AgO, CuO, $Tl_2O$, PbO or $B_2O_3$.

The glass may be molten by adding refining agents in common amounts of preferably up to 1 wt.-%.

The glass according to the invention is suitable as an optical glass for various applications, such as imaging, projection, telecommunication, optical communication, engineering, and/or laser technology, in particular also for fiber applications (image fibers and/or light transmitting fibers) having a refractive index of $1.55 \leq n_d \leq 1.65$, an Abbe number of $48 \leq v_d \leq 57$ and a very good transmission (low loss or attenuation). The glass according to the invention can be easily molten and processed and offers a good chemical stability. In addition, the glass according to the invention offers good ion-exchange characteristics and sufficient crystallization stability allowing an initial processing and secondary heat-forming steps (fiber drawing, ion-exchange, reshaping, fine cooling, final pressing) within continuous processes. The glasses according to the invention offer a good crystallization stability and a short viscosity-temperature profile whereby a thermal treatment (fiber drawing, ion-exchange, reshaping, fine cooling, final pressing) of the glasses is made possible without any problem.

The glasses according to the invention show a good environmental compatibility since they contain no thallium or lead and can be manufactured relatively cost effective, since the addition of silver, copper and other expensive components is avoided. Since the glasses according to the invention contain only small amounts of cesium and lithium, preferably none at all, and also are free of boron trioxide, the aggressiveness against refractory material is considerably decreased. Since only small amounts of titanium oxide, preferably none at all, is added, the crystallization tendency is advantageously influenced.

DETAILED DESCRIPTION OF THE PREFERRED EMBODIMENTS

The glasses according to the invention apart from maximum additions of 15 wt.-% of alkali metal oxides may also contain 8 wt.-% of alkaline earths metal oxides (MgO+CaO+SrO) and up to 6 wt. -% phosphate ($P_2O_5$) and may be molten by the addition of common refining agents.

More preferred is a glass comprising (in wt.-%):

| | |
|---|---|
| $SiO_2$ | 35 to <50 |
| $Al_2O_3$ | 1 to 10 |
| $Na_2O + K_2O$ | 5 to 15 |
| BaO | 20 to 30 |
| ZnO | 1 to 15 |

-continued

| | |
|---|---|
| La$_2$O$_3$ | 1 to 10 |
| ZrO$_2$ | 1 to 10 |
| P$_2$O$_5$ | 0 to 6 |
| MgO + CaO | 0 to 8 |
| other oxides | 0 to 2, | wherein the content of Na$_2$O is at least 5 wt.-%.

As refining agents which are commonly added in amounts of less than 1 wt.-%, preferably with a maximum amount of 0.5 wt.-%, e.g. Sb$_2$O$_3$, As$_2$O$_3$, SnO, NaCl, SO$_4^{2-}$ and F$^-$ may be used.

Preferred glasses are refined free of arsenic. However, for particular high quality fiber applications an arsenic refining facilitating low attenuation may become necessary.

The base glass system is aluminosilicate glass system which, by its own, already builds the basis for a good chemical stability, excellent ion-exchange characteristics and high crystallization stability. It is composed by the glass formers SiO$_2$ and Al$_2$O$_3$ with a total amount of 36 to <60 wt.-% (preferably 36 to 58 wt.-%, more preferred 37 to 52 wt.-%, even further preferred 40 to 52 wt.-%, particularly preferred 42 to 52 wt.-%). Herein, SiO$_2$ forms the basis with an amount of 35 to <50 wt.-% (preferably 35 to 48 wt.-%, more preferably 35 to 45 wt.-%, more preferably 37 to 45 wt.-%, particularly preferred 39 to 45 wt.-%) to which Al$_2$O$_3$ is added in amounts of 1 to 10 wt.-% (preferably 2 to 7 wt.-%, particularly preferred 3 to 7 wt.-%). Herein the minimum total content of 36 wt.-% should not be fallen short of, since this might have drawbacks with respect to the chemical resistance and with respect to the crystallization stability. Also the ratio of the two glass formers resulting from the individual content and the total content should preferably be met. Since the content of Al$_2$O$_3$ is responsible for the increase in the chemical resistance when compared with a pure silica matrix, the minimum content of which should not fall below 1 wt.-%. However, an increase of the Al$_2$O$_3$ content beyond 10 wt.-% would lead to an extremely high increase of the bulk melting temperature point and thus would lead to an increased manufacturing expenditure and to a corresponding increase in manufacturing cost. Also the length of the glass would increase which would contradict the principles of modern hot forming technologies. An increase in the total glass forming content beyond 60 wt.-%, e.g. by increasing the SiO$_2$ content beyond 50 wt.-%, would also have the same negative effect without reaching any advantages with respect to the chemical resistance. A decrease of the SiO$_2$ content below 35 wt.-% would in particular lead to a decrease in crystallization stability of the glasses according to the invention. A lowering of the Al$_2$O$_3$ content below 1 wt.-% would also lead to a deterioration of ion-exchange characteristics, since an amount within the given limits is at least necessary to expand the silicate structure of the material by means of tube structures caused by Al$_2$O$_3$, thus providing the conditions for effective diffusion and ion-exchange processes.

With respect to the desired applications the application of B$_2$O$_3$ for reducing the viscosity and the melting point of the glass is no alternative in systems of extremely low loss, since B$_2$O$_3$ would make the glasses more aggressive against refractory materials that are used. If melting would take place in silica molds by using significant boron trioxide amounts, then the high corrosion would lead to an increased input of silica into the glass and would lead to considerably shorter device lifetimes and thus to higher production cost, apart from a deviation in the glass characteristics. If melting would take place with boron additions in platinum molds, then the platinum input into the glass caused by the boron trioxide would be that high that the desired excellent attenuation characteristics could not be reached any more (in particular at the blue edge of the spectrum). Thus the application of boron trioxide is avoided in the glasses according to the invention, as well as an application of Li$_2$O and Cs$_2$O, due to the same reasons. In addition, there are synergistic effects between boron trioxide and Li$_2$O or Cs$_2$O, respectively, with respect to the aggressiveness of the glasses against refractory materials. Thus the glasses according to the invention preferably are free of B$_2$O$_3$, Li$_2$O and Cs$_2$O.

Preferably, instead Na$_2$O is utilized as fluxing agent for reducing viscosity. Thus the melting point can be kept at values also acceptable for conventional devices. Thus, for an effective application, the minimum content should not fall below 5 wt.-%, preferably 6 wt.-%, particularly preferred 8 wt.-%. Also the ion-exchange characteristics would deteriorate at a lower Na$_2$O content, since this is the component to be exchanged. At lower amounts the desired maximum refractive index could not be reached any more. Also the necessary exchange depths (at suitable step height) could not be reached any more. However, the maximum content of Na$_2$O of 15 wt.-% (preferably 12 wt.-%) should not be exceeded, since otherwise the crystallization stability would deteriorate by an increase of the diffusion rate of the crystal forming components within the matrix.

Na$_2$O may also be replaced by K$_2$O, by a suitable amount. Since K$_2$O is not as effective as Na$_2$O as a fluxing agent, preferably an amount of 10 wt.-% K$_2$O should not be exceeded when using a total content of 15 wt.-% of alkali metal oxides (Na$_2$O+K$_2$O), to avoid a negative influence on the melting characteristics and thereby on the production costs. The addition of K$_2$O preferably is directed to the fine tuning of the ion-exchange characteristics (exchange depth, amount of ion-exchange, profile shape, magnitude of generated tensions).

Apart from the fluxing agents Na$_2$O and K$_2$O, respectively, BaO and ZnO representing alkaline earth metal oxides and pseudo-alkaline earth metal oxides, represent the most important network modifiers of this system. Their main object is to adjust the shortness of the glass while keeping a somewhat high absolute viscosity in total (generated by the high amount of glass formers). ZnO at amounts between 1 and 15 wt.-% (preferably 1 to 12 wt.-%, particularly preferred 5 to 10 wt.-%) offers the most pronounced effect, however, cannot be utilized beyond the given maximum limit without increasing the crystallization tendency of the glass. Also, alkaline earth oxides at high amounts in a glass system tend to generate diffusion barrier layers and thus counteract an effective economical ion-exchange process. By falling short of the preferred minimum amount, the shortness of the glass cannot be met solely relying on BaO, since the influence thereof on the viscosity is considerably smaller. Due to this reason, BaO is added at larger amounts (20 to 30 wt.-%, preferably 22 to <30 wt.-%, particularly preferred 24 to <30 wt.-%), while also its tendency to increase to crystallization tendency is not so pronounced when compared to ZnO. In addition BaO, being a component having a relatively high refractive index, is partially responsible for reaching the desired optical position (refractive index around 1.6 at middle Abbe numbers).

An additional argument for all components discussed so far is their lack of self-absorption in the visible range having only light beginnings in the ultraviolet region. In this way, already this rudimentary glass system provides the basis for glasses with extremely small attenuation.

The system is completed by the two components $La_2O_3$ and $ZrO_2$ having a certain self-absorption. This means that both may be utilized in no case at amounts of more than 10 wt.-% (preferably here 7 wt.-%), to avoid higher transmission losses. Moreover, $ZrO_2$ as a potential nucleation agent enhances the crystallization tendency of the glasses which is detrimental for secondary heat-forming. By contrast, the minimum amounts preferably are around 1 wt.-% each, preferably around 2 wt.-% each. Both components, being highly refractive components with different effects on dispersion, mainly serve to increase chemical resistance, although to a smaller amount due to their limited content. Therefore, preferably their minimum amounts of about 1 wt.-% should not be fallen short of.

The nucleating characteristics of $TiO_2$, apart from its strong intrinsic absorption at the blue spectral edge (particularly together with Fe-contamination) is the reason that the glass is preferably free of $TiO_2$.

Also the alkaline earth metal oxides MgO, CaO and SrO may be present up to a maximum total amount of 8 wt.-%, wherein preferably only MgO and CaO are added. The maximum value of 8 wt.-% should not be exceeded, since otherwise the crystallization tendency of the glasses would increase and also the ion-exchange characteristics would be considerably impaired by the formation of dispersion blocking layers. However, within the low permitted amounts, these components help to obtain the shortness of the glasses, apart from fine tuning the ion-exchange characteristics.

Moreover, the glasses according to the invention may contain up to 6 wt.-% $P_2O_5$. It serves to further expand the network for generating tube-shaped channels for the ion-exchange processes. When exceeding the maximum amount, this characteristic leads to a destabilization of the network and thus to a decrease in crystallization stability and chemical resistance. Within the given boundaries, however, it may be added for making the glasses even shorter to facilitate modern precision heat-forming processes.

Apart from various other possible applications, the glasses according to the invention can be utilized particularly advantageously as core glass materials for making optical stepped fibers. Such optical stepped fibers at the peripheral wall of the core glass comprise a completely adjoining cladding glass, preferably having a numerical aperture of 0.3 to 0.75.

Herein as a cladding glass matched to the core glass a cladding glass may be utilized comprising (in wt.-%):

| | |
|---|---|
| $SiO_2$ | 60 to 72 |
| $B_2O_3$ | <20 |
| $Na_2O$ | <18 |
| $K_2O$ | <15 |
| $Li_2O$ | <2 |
| MgO | <3 |
| BaO | <3 |
| SrO | <4 |
| CaO | <6 |
| ZnO | <3 |
| $F^-$ | <1 |
| other oxides | 0 to 3, | wherein the glass may be molten by adding refining agents up to 1 wt.-%, preferably up to 0.5 wt.-%.

Again, apart from any unintended contaminants, no other oxides are added, apart from refining agents in amounts of up to 1 wt.-%, preferably of up to 0.5 wt.-%.

Again, apart from any unintended contaminants, the cladding glass is free of $Cs_2O$.

According to a preferred development of the invention the sum of the components $Na_2O$, $Li_2O$ and $K_2O$ within the cladding glass is smaller than 3 wt.-%. The preferred $SiO_2$-amount of the cladding glass is about 66 to 72 wt.-%.

The invention will now be described in more detail with reference to practical examples.

EXAMPLES

Tables 2 and 3 contain thirteen examples within a preferred composition range. The glasses according to the invention were prepared in the following way:

The raw materials for the oxides, preferably carbonates, nitrates and/or fluorides, are weighed out, one or more refining agents, such as $Sb_2O_3$, are added and subsequently thoroughly mixed. The bulk glass is molten at about 1350° C. within a continuous melting plant, is refined thereafter (1400° C.) and homogenized. The glass is cast at a casting temperature of about 1270° C. (or may e.g. be drawn to fiber core rods), is cooled and further processed to the desired products.

The characteristics of the glass obtained in this way are given in Table 3, example 8. A melting example for obtaining 100 kg of calculated glass is given in table 1.

TABLE 1

| oxide | wt.-% | raw material | weight (kg) |
|---|---|---|---|
| $SiO_2$ | 48.0 | $SiO_2$ | 47.90 |
| $Al_2O_3$ | 4.0 | $Al(OH)_3$ | 6.14 |
| $Na_2O$ | 5.0 | $Na_2CO_3$ | 8.56 |
| BaO | 3.0 | $Ba(NO_3)_2$ | 5.07 |
| BaO | 24.0 | $BaCO_3$ | 31.07 |
| ZnO | 6.0 | ZnO | 5.99 |
| $La_2O_3$ | 1.0 | $La_2O_3$ | 1.01 |
| $ZrO_2$ | 9.0 | $ZrO_2$ | 8.98 |
| $Sb_2O_3$ | 0.3 | $Sb_2O_3$ | 0.30 |
| sum | 100.3 | | 115.02 |

For demonstrating the compatibility with common cladding glasses (Table 4) random samples of compositions of the claimed composition range of the core glass were molten, drawn to fibers together with the given common cladding glasses and were examined:

According to the rod-tube-process a cylindrical rod of a highly refractive core glass and the tube of lower refractive cladding glass surrounding same are heated in a cylindrical furnace up to a temperature corresponding to the viscosity of about $10^4$ to $10^3$ dpas. Herein the core and cladding glasses melt together to a so-called drawing onion from which the optical fiber is drawn. The fiber diameter herein depends on the ratio of the fiber drawing speed and the following speed of the rod-tube-system and on the geometry of the core rod and tube. This process requires considerable care to keep the surface of the core rod and the inner surface of the tube extremely clean and free of any debris and particles so that they may melt together to an interface of the fiber as ideal and as free of defects as possible. Also it has been found to be advantageous when the outer diameter of the core rod and the inner diameter of the tube deviate from each other only by a few tenths of millimeters so that an even drawing onion free of faults can emerge.

The required core glass rods of different glass compositions were made as follows: For each selected glass composition a molten glass mass of 4 liters only (due to the small amount of glass needed, arsenic refining facilitating low attenuation) was cast into an ingot mold (about 400 mm×200 mm×50 mm). Out of this, two to three cylindrical rods (about 300 mm long with a diameter of 30 mm) were cut mechanically. In the last processing step the rods were delicately optically polished to fulfill the afore-mentioned requirements with respect to an ideal interface. A total of 10 different core glass types according to the invention were molten and processed to yield core glass rods, in part having the same glass compositions as the given examples, partially also having different compositions.

The cladding glasses necessary for fiber drawing were provided in a suitable tube-shape as mentioned before (inner diameter about 31 mm, outer diameter about 34 mm to 35 mm). The dimensions thereof had a small tolerance (resulting from the drawing of the tubes out of a platinum drawing die), so that no additional mechanical processing was necessary. Merely before the combining to a rod-tube-system, just before the drawing process, the core rod and the tube were carefully cleaned within an ultrasonic bath as known in the art, to provide optimum interfaces during melting within the drawing process.

The fiber drawing was performed utilizing a rod-tube-drawing machine comprising a cylindrical furnace known in the prior art. Only fibers of 70 μm diameter were drawn. This corresponds to a worldwide standard which has been established for multi-component fibers which are almost completely further processed to fiber bundles.

The cladding glass examples 4 and 5 given in Table 4 led to certain problems during the fiber drawing process, due to their increase in viscosity and to their significant length, since the viscosity-temperature-profiles of the glasses according to the invention are matched to yield "short" types, keeping in mind modern primary precision heat-forming processes. This leads to the claimed composition range of cladding glasses according to the invention with respect to the $SiO_2$ content (60 to 72 wt.-%, preferably 66 to 72 wt.-%).

All the numerical apertures measured on cladding glasses 1 to 3 were in the range between 0.3 and 0.75. Naturally, with combinations of somewhat higher refractive core glasses and somewhat lower refractive cladding glasses the higher aperture values were obtained, while combinations of somewhat less refractive core glasses with somewhat higher refractive cladding glasses yielded lower aperture values.

Attenuation was measured using the so-called back-cutting process (DIN 58 141-1). Herein extraordinary good results were obtained for the multi-component glasses being in the range of <1000 dB/km at 452 nm, <500 dB/km at 554 nm and <750 dB/km at 642 nm.

TABLE 2

Composition (wt.-%)

| | Example No. | | | | | | |
|---|---|---|---|---|---|---|---|
| | 1 | 2 | 3 | 4 | 5 | 6 | 7 |
| $SiO_2$ | 40 | 39 | 45 | 37 | 42 | 43 | 45 |
| $Al_2O_3$ | 5 | 7 | 3 | 6 | 5 | 2 | 7 |
| $Na_2O$ | 10 | 8 | 12 | 11 | 10 | 6 | 7 |
| BaO | 27 | 29.5 | 24 | 22 | 26 | 28 | 20 |
| ZnO | 8 | 5.5 | 10 | 10 | 9 | 8 | 7 |
| $La_2O_3$ | 5 | 7 | 2 | 7 | 6 | 5 | 4 |
| $ZrO_2$ | 5 | 4 | 5 | 7 | 2 | 8 | 10 |
| $As_2O_3$ | | 0.3 | | | 0.3 | | |
| sum | 100 | 100.3 | 100 | 100 | 100.3 | 100 | 100 |
| $n_d$ | 1.6001 | 1.6042 | 1.5888 | 1.6045 | 1.5928 | 1.6097 | 1.6005 |
| $v_d$ | 52.3 | 52.5 | 52.2 | 51.3 | 52.5 | 53.0 | 51.2 |
| $P_{g,F}$ | 0.5521 | 0.5501 | 0.5521 | 0.5534 | 0.5520 | 0.5507 | 0.5540 |
| $\Delta P_{g,F}(10^{-4})$ | −36 | −33 | −36 | −40 | −33 | −37 | −36 |
| $\rho$ (g/cm$^3$) | 3.69 | 3.36 | 3.28 | 3.38 | 3.29 | 3.49 | 3.23 |
| $\alpha_{20-300}$ ($10^{-6}$ * $K^{-1}$) | 10.8 | 8.7 | 10.2 | 9.3 | 9.4 | 8.1 | 7.5 |
| Tg (° C.) | 541 | 570 | 547 | 550 | 548 | 617 | 588 |

TABLE 3

Composition (wt.-%)

| | Example No. | | | | | |
|---|---|---|---|---|---|---|
| | 8 | 9 | 10 | 11 | 12 | 13 |
| $SiO_2$ | 48 | 35 | 41 | 49 | 49 | 36 |
| $Al_2O_3$ | 4 | 10 | 8 | 1 | 9 | 2 |
| $Na_2O$ | 5 | 15 | 13 | 5 | 9 | 14 |
| BaO | 27 | 20 | 23 | 21 | 20 | 29.5 |
| ZnO | 6 | 11 | 12 | 15 | 1 | 14 |
| $La_2O_3$ | 1 | 8 | 10 | 3 | 9 | 2 |
| $ZrO_2$ | 9 | 1 | 3 | 6 | 3 | 2.5 |
| $Sb_2O_3$ | 0.3 | | | | 0.3 | |
| sum | 100.3 | 100 | 100 | 100 | 100.3 | 100 |

TABLE 3-continued

Composition (wt.-%)

| | Example No. | | | | | |
|---|---|---|---|---|---|---|
| | 8 | 9 | 10 | 11 | 12 | 13 |
| $n_d$ | 1.6008 | 1.5897 | 1.5984 | 1.5996 | 1.5828 | 1.5968 |
| $v_d$ | 52.7 | 50.5 | 51.0 | 52.9 | 51.6 | 52.8 |
| $P_{g,F}$ | 0.5518 | 0.5551 | 0.5539 | 0.5512 | 0.5538 | 0.5511 |
| $\Delta P_{g,F}(10^{-4})$ | −32 | −37 | −40 | −34 | −33 | −36 |
| $\rho$ (g/cm³) | 3.32 | 3.18 | 3.30 | 3.36 | 2.97 | 3.50 |
| $\alpha_{20-300}$ ($10^{-6} * K^{-1}$) | 7.6 | 10.5 | 9.5 | 7.3 | 7.9 | 11.7 |
| $T_g$ (° C.) | 622 | 479 | 522 | 618 | 529 | 535 |

TABLE 4

Cladding glass embodiments
Composition (wt.-%)

| | Example No. | | | | |
|---|---|---|---|---|---|
| | 1 | 2 | 3 | 4 | 5 |
| $SiO_2$ | 69 | 70 | 68 | 81 | 75 |
| $B_2O_3$ | 19 | 1 | 3 | 12 | 10 |
| $Al_2O_3$ | 3 | 4 | 8 | 2.5 | 5 |
| $Na_2O$ | 1 | 13 | 15 | 3.5 | 7 |
| $K_2O$ | 8 | 2.3 | | 1 | 0.1 |
| $Li_2O$ | | | 1 | | |
| MgO | | 2.5 | | | |
| BaO | | 2 | | | 0.6 |
| CaO | | 5 | 3 | | 1.4 |
| ZnO | | | 1.5 | | |
| $F^-$ | | 0.2 | 0.5 | | 0.2 |

The invention claimed is:

1. An aluminosilicate glass comprising (in wt.-%):

| $SiO_2$ | 39 to 45 |
|---|---|
| $Al_2O_3$ | 3 to 7 |
| $Na_2O + K_2O + Cs_2O + Li_2O$ | 5 to 15 |
| BaO | 24 to <30 |
| ZnO | 5 to 10 |
| $La_2O_3$ | 2 to 7 |
| $ZrO_2$ | 2 to 7 |
| $P_2O_5$ | 0 to 6 |
| | and |
| MgO + CaO | 0 to 8, | wherein the sum of $Na_2O$ and $K_2O$ is 8 to 12 wt.-%.

2. An aluminosilicate glass consisting of (in wt.-%):

| $SiO_2$ | 35 to <50 |
|---|---|
| $Al_2O_3$ | 1 to 10 |
| $Na_2O + K_2O + Cs_2O + Li_2O$ | 5 to 15 |
| the $Na_2O + K_2O + Cs_2O + Li_2O$ providing less than 1 wt. % $Cs_2O$ and less than 1 wt. % $Li_2O$ to the glass | |
| BaO | 20 to 30 |
| ZnO | 0 to 15 |
| $La_2O_3$ | 1 to 10 |
| $ZrO_2$ | 0 to 10 |
| $TiO_2$ | <1 |
| $P_2O_5$ | 0 to 6 |
| MgO + CaO + SrO | 0 to 8 |
| | and |
| at least one refining agent residue | 0 to 1. |

3. The aluminosilicate glass of claim 2 wherein said glass is at least substantially free of $TiO_2$, $Li_2O$ and $Cs_2O$.

4. The aluminosilicate glass of claim 2, consisting of (in wt.-%):

| $SiO_2$ | 35 to <50 |
|---|---|
| $Al_2O_3$ | 1 to 10 |
| $Na_2O + K_2O$ | 5 to 15 |
| BaO | 20 to 30 |
| ZnO | 1 to 15 |
| $La_2O_3$ | 1 to 10 |
| $ZrO_2$ | 1 to 10 |
| $P_2O_5$ | 0 to 6 |
| MgO + CaO | 0 to 8 |
| | and |
| at least one refining agent residue | 0 to 1, | wherein the amount of $Na_2O$ is at least 5 wt.-%.

5. The aluminosilicate glass of claim 4, consisting of (in wt.-%):

| $SiO_2$ | 35 to <50 |
|---|---|
| $Al_2O_3$ | 1 to 10 |
| $Na_2O + K_2O$ | 5 to 15 |
| BaO | 20 to 30 |
| ZnO | 1 to 15 |
| $La_2O_3$ | 1 to 10 |
| $ZrO_2$ | 1 to 10 |
| $P_2O_5$ | 0 to 6 |
| | and |
| MgO + CaO | 0 to 8. |

6. The aluminosilicate glass of claim 2, wherein said refining agent residue is obtained from a refining agent that is any one or more of $Sb_2O_3$, $As_2O_3$, SnO, NaCl, $SO_4^{--}$ and $F^-$.

7. The aluminosilicate glass of claim 2, consisting of (in wt.-%):

| $SiO_2$ | 35 to 48 |
|---|---|
| $Al_2O_3$ | 1 to 10 |
| $Na_2O + K_2O$ | 5 to 15 |
| BaO | 20 to <30 |
| ZnO | 1 to 12 |
| $La_2O_3$ | 1 to 10 |
| $ZrO_2$ | 1 to 10 |
| $P_2O_5$ | 0 to 6 |
| | and |
| MgO + CaO | 0 to 8. |

8. The aluminosilicate glass of claim 2, consisting of (in wt.-%):

| | |
|---|---|
| $SiO_2$ | 35 to 45 |
| $Al_2O_3$ | 2 to 7 |
| $Na_2O + K_2O$ | 6 to 12 |
| $BaO$ | 20 to <30 |
| $ZnO$ | 5 to 10 |
| $La_2O_3$ | 1 to 7 |
| $ZrO_2$ | 1 to 10 |
| $P_2O_5$ | 0 to 6 |
| | and |
| $MgO + CaO$ | 0 to 8. |

9. The aluminosilicate glass of claim 2, consisting of (in wt.-%):

| | |
|---|---|
| $SiO_2$ | 37 to 45 |
| $Al_2O_3$ | 3 to 7 |
| $Na_2O + K_2O$ | 8 to 12 |
| $BaO$ | 22 to <30 |
| $ZnO$ | 5 to 10 |
| $La_2O_3$ | 2 to 7 |
| $ZrO_2$ | 2 to 7 |
| $P_2O_5$ | 0 to 6 |
| | and |
| $MgO + CaO$ | 0 to 8. |

10. The aluminosilicate glass of claim 2, consisting of (in wt.-%):

| | |
|---|---|
| $SiO_2$ | 39 to 45 |
| $Al_2O_3$ | 3 to 7 |
| $Na_2O + K_2O$ | 8 to 12 |
| $BaO$ | 24 to <30 |
| $ZnO$ | 5 to 10 |
| $La_2O_3$ | 2 to 7 |
| $ZrO_2$ | 2 to 7 |
| $P_2O_5$ | 0 to 6 |
| | and |
| $MgO + CaO$ | 0 to 8. |

11. The aluminosilicate glass of claim 2 having a refractive index $n_d$ of $1.55 \leq n_d \leq 1.65$ and an Abbe number of $48 \leq v_d \leq 57$.

12. An optical stepped-index fiber comprising a core glass fiber and fully clad at an outer surface thereof by a cladding glass, said optical step index fiber having a numerical aperture of 0.30 to 0.75 and comprising a core glass fiber consisting of (in wt.-%):

| | |
|---|---|
| $SiO_2$ | 35 to <50 |
| $Al_2O_3$ | 1 to 10 |
| $Na_2O + K_2O + Cs_2O + Li_2O$ | 5 to 15 |
| the $Na_2O + K_2O + Cs_2O + Li_2O$ providing less than 1 wt. % $Cs_2O$ and less than 1 wt. % $Li_2O$ to the glass | |
| $BaO$ | 20 to 30 |
| $ZnO$ | 0 to 15 |
| $La_2O_3$ | 1 to 10 |
| $ZrO_2$ | 0 to 10 |
| $TiO_2$ | <1 |
| $P_2O_5$ | 0 to 6 |
| $MgO + CaO + SrO$ | 0 to 8 |
| | and |
| at least one refining agent residue | 0 to 1. |

13. The optical stepped-index fiber of claim 12, wherein said cladding glass comprises (in wt.-%):

| | |
|---|---|
| $SiO_2$ | 60 to 72 |
| $B_2O_3$ | <20 |
| $Na_2O$ | <18 |
| $K_2O$ | <15 |
| $Li_2O$ | <2 |
| $MgO$ | <3 |
| $BaO$ | <3 |
| $SrO$ | <4 |
| $CaO$ | <6 |
| $ZnO$ | <3 |
| | and |
| $F^-$ | <1. |

14. The optical stepped-index fiber of claim 13, wherein said cladding glass, apart from any unintended contaminants, is free of $Cs_2O$.

15. The optical stepped-index fiber of claim 12, wherein the sum of the components $Na_2O$, $Li_2O$ and $K_2O$ is smaller than 3 wt.-%.

16. The optical stepped-index fiber of claim 12, wherein the content of $SiO_2$ in said cladding glass is between 66 and 72 wt.-%.

* * * * *